United States Patent Office 3,689,233
Patented Sept. 5, 1972

3,689,233
PROCESS FOR THE MANUFACTURE OF HARD ASHLESS CHARCOAL BRIQUETTES
Alberto E. Veloso, Quezon City, Philippines, assignor to Internationale Erfinder- und Patentanstalt, Vaduz, Liechtenstein
No Drawing. Filed Oct. 20, 1970, Ser. No. 82,549
Int. Cl. C101 5/00
U.S. Cl. 44—10 C      11 Claims

ABSTRACT OF THE DISCLOSURE

A process for the preparation of hard, ashless charcoal briquettes is described, in which a finely divided carbonaceous raw material is charged into an electrolytic cell containing an electrolyte with sulfuric acid added, the raw material being held in porous containers electrically connected to an electrode of the cell, whereby the raw material is converted to substantially pure carbon by the removal of inorganic impurities in the raw material. The carbon produced in the electrolytic cell may be removed and washed to remove soluble impurities, dried and compressed into briquettes at a pressure of at least 200 tons per square inch and cured in the presence of an inert gas at a pressure of at least 100 ton/in.$^2$. Preferably the above steps are preceded by a step of converting a vegetable carbon source to a finely divided carbonaceous raw material, by dehydration in the presence of 50–100 percent sulfuric acid.

BACKGROUND OF THE INVENTION

Field of the invention

The invention relates to the purification of carbon by removal of inorganic impurities from carbonaceous raw material, and in particular to the manufacture of hard ashless charcoal briquettes.

Prior art

Conventional hardwood charcoal briquettes contain impurities and produce only about 25,000–26,000 B.t.u. per cubic foot, as compared to 35,000–40,000 B.t.u. per cubic foot for coke. The heat value of charcoal could be raised significantly if the percentage of ash could be reduced. Furthermore, its fuel value could be improved substantially if it had improved hardness, such that it could withstand impact of weight, for example in a smelter furnace. Ordinary charcoal crumples before it reaches its peak of heating, while coke does not. Therefore, it is desirable to briquette charcoal in order to approach the hardness of coke. It is a major objective of the present invention to render charcoal or vegetable black briquettes ashless and substantially harder than coke, such that the heat value of the resulting briquettes attains about 60,000–80,000 B.t.u. per cubic foot. At this level of heat values, charcoal briquettes can be an economical and efficient fuel for blast furnace smelters in the steel industry.

SUMMARY

The invention improves the quality of charcoal briquettes by purifying the charcoal prior to its formation into briquettes. In accordance with the invention, such purification is accomplished electrolytically by immersing finely divided carbonaceous material into an electrolyte. Electrodes are also immersed into the electrolyte, with electrodes of one potential being placed in the vicinity of the carbonaceous material, so that a concentration of active ions is available, upon application of a potential difference to the electrodes, in the vicinity of the carbonaceous material for reaction with the inorganic impurities therein.

DETAILED DESCRIPTION OF THE INVENTION

The present invention in its preferred form is suitable for the preparation of hard ashless charcoal briquettes from charcoal or other vegetable carbon sources, such as wood, vines, shrubs, agricultural and forest crop waste products, wine dregs, sawdust, bagasse, peat, lignite, nutshells, coconut or walnut shells, rice husks, corncobs, coal, carbon black or any vegetable or carbonaceous matter, whether or not the material is in the form of charcoal or in its raw and uncharred state. In the present process the carbon source is separated and substantially freed from inorganic elements forming part of its original composition or inorganic impurities imbedded into the carbonaceous matter, thereby yielding substantially pure carbon. From this substantially pure carbon an extremely hard and ashless briquette can be molded.

Briefly, in accordance with the present process, an extremely hard and ashless charcoal briquette is prepared by purifying charcoal into a pure form of carbon, subjecting it to high pressure and temperature in a briquette molding machine, and cooling it and curing it under high pressure in the presence of carbon dioxide or an equivalent inert gas, whereby the carbon crystallizes and is released as hard ashless briquettes.

The preferred process consists of several steps. In the first step, a finely ground vegetable carbon source, such as wood, shrubs, or the like, is dehydrated in the presence of concentrated sulfuric acid to form a finely divided carbonaceous raw material. The first step may be omitted if a suitable carbonaceous material, such as charcoal, is available. The carbonaceous raw material is then charged into an electrolytic cell, the material being held in porous containers electrically connected to an electrode of such cell. In the electrolytic cell the inorganic impurities are removed from the carbonaceous raw material and dissolved in the electrolyte, by the action of the electrolytic cell. The remaining carbonaceous material after passing through the cell has become substantially pure carbon. This product may be purified by water washing and, if desired, washing with dilute hydrofluoric acid in order to remove any siliceous materials still associated with the carbon. The washed carbon is then dried and compressed at a temperature of at least 550° C. and a pressure of at least 200 tons per square inch to form hard ashless briquettes. The briquettes are then cured in the presence of carbon dioxide for at least 20 hours at a pressure of at least 50 tons/in.$^2$.

The present process is extremely effective in removing inorganic impurities from the charcoal to form substantially pure ashless charcoal briquettes. By means of the electrolytic cell, these inorganic impurities are removed more rapidly and efficiently than with other methods. Moreover, since sulfuric acid is the principal electrolyte in the cell, it is possible to charge directly into the cell, as a carbonaceous raw material, the product of dehydration by concentrated sulfuric acid of vegetable matter, such as wood, shrubs or the like.

In the first, alternative step, uncharred raw material or vegetable matter, such as wood, vines, shrubs, agricultural and forest crop wastes products, or the like, in any form, is ground and carbonized either by a thermal or chemical method. The uncharred vegetable matter may be converted to carbonaceous material suitable for the following steps by the conventional processes of destructive distillation. Preferably, however, the uncharred vegetable matter is ground finely and placed into a vat and contacted with concentrated sulfuric acid in complete immersion. Preferably the sulfuric acid is at a concentration of at least 66° Bé. or at least 93 percent. Sulfuric acid in lower concentration, above about 50 percent is also suitable although not desirable. Fuming sulfuric acid, at about 100 percent concentration or 70° Bé. is also usable, although not preferred. During this carbonization step, the vegetable matter is dehydrated by a violent exothermic reaction to form a carbonaceous raw material suitable for the succeeding steps of the present process. The carbonization reaction will of course lower the concentration of sulfuric acid. Nevertheless, subsequent batches of uncharred vegetable matter may be charged into the same vat, until the concentration of the sulfuric acid is reduced to a level unsuitably low, whereupon additional concentrated or fuming sulfuric acid should be added. The temperature in the vat rises during the exothermic carbonization reaction, up to as much as 150–280° C.

In the carbonization step all of the vegetable matter, including carbohydrates, cellulose, lignans and the like, is converted by dehydration to carbon, water and hydrogen in the presence of the concentrated sulfuric acid. Certain organic compounds present in the vegetable matter also will react with the sulfuric acid to form sulfonates or organic acids, which will either volatilize and be removed from the carbonaceous residue or be removed in the succeeding extraction or washing steps of the present process.

In the step of purification, inorganic impurities are removed from carbonaceous raw material, either the carbonized vegetable from the above step or finely pelleted charcoal or the like, or combinations thereof. The finely divided carbonaceous raw material is placed into porous containers and passed through an electrolytic cell containing an electrolyte of dilute sulfuric acid at a concentration of about 5–40 percent, the porous container being in connection with an electrode of the cell. As the porous containers pass through the electrolytic cell, inorganic impurities are removed into solution from the finely divided carbonaceous raw material. This dissolution occurs at least in part because of the electrolytic reaction at the electrodes. Preferably, the electrodes are operated intermittently and the materials of the electrodes of the electrolytic cell are intermittently reversed, for periods of about 1 to 12 minutes, in order to facilitate the dissolution of the inorganic impurities from the carbonaceous raw materials. Inactivation of the electrodes after short intervals, preferably on the order of 1 to 12 minutes, also serves to avoid overvoltage at the electrodes and minimizes the departure from equilibrium upon reversing the electrode connections.

The concentration of the sulfuric acid in the electrolyte is quite dilute, on the order of 5–40 percent. If the optional first step is employed, the carbonized vegetable materials charged to the electrolyte will include a substantial amount of concentrated sulfuric acid. Hence in this case, the concentration of sulfuric acid in the electrolyte would be on the higher end of the range, although it is possible to use only the sulfuric acid carried over with the carbonized vegetable materials as the electrolyte.

The carbonaceous raw materials are finely divided, and may include charcoal produced by incomplete combustion or destructive distillation, ground into pellets of about 1/8–1/4 inch diameter. The finely divided carbonaceous raw material may be held in a porous mesh plastic, for example, acrylic plastic filaments 1/16 inch in diameter woven into a 1/16 inch mesh material. The carbonaceous material within these containers is connected to one of the electrodes of the cell, while the electrodes of opposite polarity suitably made of graphite, are placed alternately between the porous containers in the electrolyte solution, and carried through the cell together with the containers. Alternatively, the containers with their associated electrodes may pass between stationary electrodes of opposite polarity.

The cell operates at about 3.5–24 volts, a current density of about 40–80 amperes per square foot, and 20–90° C. Under these conditions during operation of the cell, the sulfate ions are copiously evolved in the region of the carbonaceous raw material and penetrate into the interstices of the carbonaceous raw material and react with the inorganic compounds or constituents of the carbonaceous material to form respective sulfate compounds, which are dissolved into the electrolytic solution. As mentioned above, the dissolution of the inorganic impurities is enhanced by reversing the potential of the electrodes for brief periods. Ordinarily the removal of the inorganic impurities is accomplished within about 20 minutes under the conditions listed above. However, the carbonaceous raw material may be present in the electrolytic cell for a period of between about 10–30 minutes.

After completion of the electrolytic removal of the inorganic impurities from the carbonaceous raw material, the porous containers are removed from the electrolytic cell to a washing vat containing hot water at a temperature of about 70–100° C. Preferably the material is washed for about 10 minutes, dried in a centrifugal drier and washed again for three further wash cycles. Then the material is rinsed with cool water at a temperature of about 20–30° C., until it is freed from acid. The washed carbonaceous material may contain a small amount of silicates, which may be removed by treatment with dilute hydrofluoric acid in a separate vat. Silicate removal may be accomplished also electrolytically in a sodium chloride solution, or by boiling with a sodium hydroxide solution at about 15–40° Bé. Preferably, however, the silicates are removed by washing in a 10–20 percent hydrofluoric acid solution.

After the final washing step, the carbonaceous material is sent to a centrifugal drier and damp dried, and finely ground to prepare it for briquetting. At this point the material is substantially pure and ashless, comprising essentially 99.75 percent carbon, with a trace of siliceous compounds as impurities.

The washed and dried carbon is next subjected to briquetting in a high temperature, high pressure briquetting machine at about 200–550 ton per square inch pressure and about 50–1500° C.

The briquettes thus formed are next removed to a high pressure curing chamber of appropriate construction, provided with cooling means. The briquettes are cured in the presence of carbon dioxide, or an equivalent inert gas, under a pressure of about 100–250 tons per square inch for about 20–48 hours. The longer the briquettes are cured, the higher is their hardness. Preferably two curing chambers are used in a pair, so that when curing is through the carbon dioxide can be stored for succeeding batches.

The vats employed in the above steps may be of similar construction and dimension. Suitable vats, for carbonization, electrolytic removal of impurities, washing, and curing, have dimensions of 24 x 8 x 6 feet, and are constructed of 1.5 inch thick steel, heavily tarred and lined with fire bricks dipped in tar, and heavily reinforced and insulated. Hard ashless charcoal briquettes made in accordance with the present process exhibit excellent qualities of hardness and fuel value. Briquettes produced at 500 tons per square inch pressure and 1500° C. exhibit a specific gravity of about 3.16–3.18, a hardness of about 9 on the Mohs scale, and a heat value of about 40,000–45,000 B.t.u. per pound. Briquettes made at about 250 tons per square inch pressure and 1500° C. exhibit a specific gravity of about 1.93–1.94, a hardness of about 5.5, and a heat value of about 25,000 B.t.u. per pound. Briquettes made at 250 tons per square inch and 750° C., and cured in the presence of carbon dioxide at a pressure of 100 tons per square inch for 20 hours exhibit a specific gravity of about 1.58–1.59, a hardness of about 4.5 and a heat value of about 20,000 B.t.u. per pound. Accordingly, it is evident that the present process can substantially improve the fuel value and hardness of hardwood charcoal.

I claim:

1. A process for the preparation of hard, ashless charcoal briquettes, which comprises:

charging a finely divided carbonaceous raw material containing substantially no carbohydrates, cellulose, lignans and the like into an electrolytic cell having an electrolyte comprising an aqueous solution of sulfurnic acid at a concentration of about 5–40 percent, holding said raw material in at least one porous container in the vicinity of an electrode of said cell, electrically connecting said raw material to said electrode, whereby said carbonaceous raw material is converted to substantially pure carbon;

removing said carbon from said porous container to a washing container, removing soluble impurities from said carbon by water washing, and drying said carbon;

compressing said carbon to form hard, ashless briquettes at a temperature of at least 550° C. and a pressure of at least 200 tons per square inch, and curing said briquettes in the presence of carbon dioxide at a pressure of at least 50 tons/in.$^2$ for at least 20 hours.

2. The process of claim 1, wherein said electrolytic cell is operated at about 3.5–24 volts, 40–80 amperes per square foot for a period of at least 10 minutes.

3. The process of claim 1, wherein said substantially pure carbon is treated with a 10–20 percent solution of hydrofluoric acid, whereby silicate impurities are removed.

4. A process for the preparation of hard, ashless charcoal briquettes from a finely ground vegetable carbon source, which comprises:

removing substantially all carbohydrates, cellulose, lignans and the like from said vegetable carbon source by contacting said source with sulfuric acid at a concentration of about 50–100 percent, to form a finely divided carbonaceous raw material;

charging said finely divided carbonaceous raw material into an electrolytic cell having an electrolyte comprising an aqueous solution of sulfuric acid at a concentration of about 5–40 percent, holding said raw material in at least one porous container in the vicinity of an electrode of said cell, electrically connecting said raw material to said electrode, whereby said carbonaceous raw material is converted to substantially pure carbon;

removing said carbon from said porous container to a washing container, removing soluble impurities from said carbon by water washing, and drying said carbon;

compressing said carbon to form hard, ashless briquettes at a temperature of at least 550° C. and a pressure of at least 200 tons per square inch, and curing said briquettes in the presence of carbon dioxide at a pressure of at least 50 tons/in.$^2$ for at least 20 hours.

5. The process of claim 4, wherein said electrolytic cell is operated at about 3.5–24 volts, 40–80 amperes per square foot, for a period of at least 10 minutes.

6. The process of claim 4, wherein said substantially pure carbon is treated with a 10–20 percent solution of hydrofluoric acid whereby silicate impurities are removed.

7. The process of claim 4, wherein finely ground charcoal is combined with said carbonaceous raw material and charged into said electrolytic cell.

8. A process for removing substantially all inorganic impurities from a carbonaceous raw material and for obtaining substantially pure carbon, which comprises:

charging a finely divided carbonaceous raw material into porous containers, providing electrical connection between said material and an electrode of an electrolytic cell containing dilute sulfuric acid as an electrolyte, passing said containers through said electrolyte while applying an electric potential to said electrolyte in the vicinity of said containers, and electrolytically, or chemically converting said inorganic impurities to soluble or volatile compounds or ions; and removing said containers from said electrolyte to a wash vat and washing said material to remove said soluble compounds or ions and to obtain substantially pure carbon.

9. The process of claim 8, wherein said electric potential is deactivated and reversed for periods of about 1 to 12 minutes each.

10. A process for preparing hard, ashless charcoal briquettes from a vegetable carbon source, which comprises:

grinding said vegetable carbon source and substantially completely dehydrating the ground product by contact with concentrated sulfuric acid to form a finely divided carbonaceous material;

charging said carbonaceous material into porous containers, provided electrical connection between said material and an electrode of an electrolytic cell containing dilute sulfuric acid as an electrolyte, passing said containers through said electrolyte while applying an electric potential to said electrolyte in the vicinity of said containers, and electrolytically or chemically converting substantially all inorganic impurities to soluble or volatile compounds or ions;

removing said containers from said electrolyte to a wash vat and washing said material to remove said soluble compounds or ions and to obtain substantially pure carbon;

compressing said carbon to form hard, ashless briquettes at a temperature of at least 550° C. and a pressure of at least 200 tons per square inch, and curing said briquettes in the presence of carbon dioxide at a pressure of at least 50 tons/in.$^2$ for at least 20 hours.

11. The process of claim 10, wherein said electric potential is deactivated and reversed for periods of about 1 to 12 minutes each.

References Cited
UNITED STATES PATENTS

| | | | |
|---|---|---|---|
| 3,436,312 | 4/1969 | Leonor | 44—1 R |
| 904,684 | 11/1908 | Crumiére | 204—132 |
| 1,219,438 | 3/1917 | Catlin | 252—444 |
| 3,093,463 | 6/1963 | Medley | 44—10 R |
| 2,003,277 | 5/1935 | Olson | 252—444 |

CARL F. DEES, Primary Examiner

U.S. Cl. X.R.

44—10 H; 23—209.1; 204—173